US009544266B2

(12) United States Patent
Tuliani

(10) Patent No.: US 9,544,266 B2
(45) Date of Patent: Jan. 10, 2017

(54) NSEC3 PERFORMANCE IN DNSSEC

(71) Applicant: Microsoft Technology Licensing, LLC, Redmond, WA (US)

(72) Inventor: Jonathan Roshan Tuliani, Mount Merrion (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 14/317,461

(22) Filed: Jun. 27, 2014

(65) Prior Publication Data
US 2015/0381558 A1 Dec. 31, 2015

(51) Int. Cl.
G06F 21/00 (2013.01)
H04L 29/06 (2006.01)
H04L 29/12 (2006.01)
H04L 9/32 (2006.01)
H04L 29/08 (2006.01)

(52) U.S. Cl.
CPC ......... *H04L 61/1511* (2013.01); *H04L 9/3236* (2013.01); *H04L 63/12* (2013.01); *H04L 67/42* (2013.01); *H04L 61/6013* (2013.01)

(58) Field of Classification Search
CPC ...... H04L 61/151; H04L 9/3236; H04L 67/42; H04L 61/1511; H04L 63/12; H04L 61/6013
See application file for complete search history.

(56) References Cited

U.S. PATENT DOCUMENTS

| 8,358,778 B2 | 1/2013 | Landrock et al. |
| 2007/0010914 A1 | 1/2007 | Johnson et al. |
| 2008/0104182 A1 | 5/2008 | Jimmei |
(Continued)

FOREIGN PATENT DOCUMENTS

| EP | 2511870 A1 | 10/2012 | |
| EP | 2779594 A2 * | 9/2014 | .......... H04L 61/1511 |

OTHER PUBLICATIONS

Matthäus Wander; Lorenz Schwittmann; Christopher Boelmann; Torben Weis; "GPU-Based NSEC3 Hash Breaking"; Network Computing and Applications (NCA), 2014 IEEE 13th International Symposium on Year: Jun. 2014; pp. 137-144.*

(Continued)

*Primary Examiner* — David García Cervetti
*Assistant Examiner* — Courtney Fields
(74) *Attorney, Agent, or Firm* — Ben Tabor; Kate Drakos; Micky Minhas

(57) ABSTRACT

A method includes receiving, at a server, a request from a DNS client. The request identifies a domain name to be resolved that is not able to be resolved by the server. The method includes identifying a hash of the domain name as being part of a set of hashes. The hash of the domain name identified at the server was computed using a first cryptographic technique. However, the hash can be computed by an external system using a second cryptographic technique. The first cryptographic technique is able to compute the hash in substantially fewer or substantially less complex operations than the operations required to compute the hash using the second cryptographic technique. The method further includes returning a result indicating that the domain name cannot be resolved, including returning an indicator identifying the set of hashes.

20 Claims, 3 Drawing Sheets

(56) References Cited

U.S. PATENT DOCUMENTS

| | | | |
|---|---|---|---|
| 2008/0285746 A1* | 11/2008 | Landrock | H04L 9/3236 380/29 |
| 2010/0269174 A1* | 10/2010 | Shelest | H04L 29/12066 726/22 |
| 2011/0231913 A1 | 9/2011 | Feng et al. | |
| 2012/0117621 A1 | 5/2012 | Kondamuru et al. | |
| 2012/0155646 A1 | 6/2012 | Seshadri et al. | |
| 2012/0284505 A1* | 11/2012 | Smith | H04L 61/1511 713/151 |
| 2013/0063273 A1 | 3/2013 | Bhageria et al. | |
| 2014/0244998 A1* | 8/2014 | Amenedo | H04L 63/062 713/156 |

OTHER PUBLICATIONS

Rose, et al., "Minimizing Information Leakage in the DNS", In IEEE Network of the Magazine of Global Internetworking, vol. 22, Issue 2, Mar. 2008, 14 pages.

Wander, et al., "GPU-based NSEC3 Hash Breaking", In Workshop of DNS-OARC, May 13, 2013, 13 pages.

Waters, et al., "New Client Puzzle Outsourcing Techniques for DoS Resistance", In Proceedings of the 11th ACM conference on Computer and communications security, Oct. 25, 2004, 11 pages.

"International Search Report & Written Opinion Received for PCT Application No. PCT/US2015/037312", Mailed Date: Sep. 29, 2015, 11 Pages.

Laurie, et al., "DNS Security (ONSSEC) Hashed Authenticated Denial of Existence", In Network Working Group, Mar. 2008, 52 Pages.

Rivest, L. Ronald., "Description of the LCS35 Time Capsule Crypto-Puzzle", Retrieved at <<https://web.archive.org/web/20071123063824/http://people.csail.mit.edu/rivest/lcs35-puzzle-description.txt>> Published on: Apr. 4, 1999, 6 Pages.

Rivest, et al., "Time-Lock Puzzles and Timed-Release Crypto", Retrieved at <<http://theory.lcs.mit.edu/rivest/RivestShamirWagner-timelock.pdf>> Published on: Mar. 10, 1996, 9 Pages.

Tuliani, Dr. Jonathan, "Improved NSEC3 Performance in DNS-SEC", Retrieved at <<https://indico.dns-oarc.net/event/20/session/2/contribution/0/material/slides/1.pdf>> Published on: Oct. 12, 2014, 11 Pages.

"Second Written Opinion Issued in PCT Application No. PCT/US2015/037312", Mailed Date: May 4, 2016, 6 Pages.

"International Preliminary Report on Patentability Issued in PCT Application No. PCT/US2015/037312", Mailed Date: Sep. 19, 2016, 7 Pages.

* cited by examiner

NSEC3 PERFORMANCE IN DNSSEC

BACKGROUND

Background and Relevant Art

The Domain Name System (DNS) is a system for translating domain names (e.g. www.microsoft.com) into IP addresses (e.g. 65.55.57.27). A very much simplified typical message flow is as follows:

(1) A DNS client (e.g. PC or phone) makes a DNS request containing the name www.microsoft.com to its locally configured caching DNS server.

(2) The caching DNS server makes further DNS requests to various authoritative DNS servers to gather the data necessary to obtain the IP address for the query. (The exact number depends on how the domain name and caching DNS server have been configured.)

(3) Each authoritative DNS server responds to the caching DNS server with a DNS response, based on its internal list of DNS records. These responses contain information about other queries the caching DNS server needs to make to resolve the original query, or may contain the actual result the DNS client is looking for. The response may also indicate that the domain name being sought could not be found—this is called a negative response.

(4) The caching DNS server returns a DNS response to the DNS client containing the data the DNS client was looking for, or a negative response. The caching DNS server also caches the data it retrieved from the authoritative DNS servers to enable it to respond to future DNS queries more quickly.

DNS as originally designed had no built-in authentication. The purpose of DNSSEC is to address this, by providing digitally signed DNS responses. These signatures are generated by the authoritative DNS servers and passed to the caching DNS server as part of the DNS responses. They are verified by the caching DNS server which then returns a flag to the DNS client to indicate that verification was successful. (There are also alternative designs in which the verification is carried out directly by the DNS client.)

For security and performance reasons, the DNSSEC is designed to use off-line signing. That is, the set of DNS records in each authoritative DNS server is signed in advance, and the signatures are stored on the authoritative DNS server. This avoids the need to create signed responses on-the-fly as DNS queries are received (which would be computationally expensive and therefore impede performance), and avoids the signing key being vulnerable to exposure should the authoritative DNS server be compromised.

DNSSEC is designed to verify not only the authenticity of existing DNS records, but also the authenticity of negative responses, i.e. responses indicating that a domain name cannot be resolved. Since negative responses are provided for random DNS queries, it is not possible to pre-sign every possible negative response in advance (as there are virtually an unlimited number of domain names that may not be able to be resolved), as required by off-line signing.

To enable off-line signing of negative responses, 'NSEC' records were created. An NSEC record is returned by an authoritative DNS server to indicate that 'there are no DNS records between <X> and <Y>'. In essence, existing records are placed in alphabetical order, and NSEC records are created (and signed) for each of the 'gaps' between them.

Because each NSEC record indicates the name of the next actual DNS record, they enable an outsider to discover all the DNS records, through a series of queries. To address this, NSEC3 records were created. These use a similar concept—sequencing records, and creating signed records for each 'gap' in that sequence. The difference is in the sequencing—for NSEC3, the DNS record names are 'hashed', and these hashes are placed in sequence. If the record name in the DNS query does not match an existing record, then this record name is also hashed, and the NSEC3 record for the range containing that hash is returned. That is, each NSEC3 record indicates 'there are no DNS records whose name hash lies between <X> and <Y>'.

This is helpful, because an attacker wishing to list all the DNS records now needs to search for record names matching the hash values returned in the NSEC3 responses. This is not impossible, but is computationally intensive for the attacker. To make it even more difficult, a computationally expensive and irreversible hash function is used, for example by iterating a conventional cryptographic hash function 1,000 times.

This in turn creates a performance challenge for the authoritative DNS server. In order to serve a DNS response containing an NSEC3 record, the server must also compute the computationally expensive hash of the record name in the DNS query. And the caching DNS server, to verify the DNS response, must do likewise. In addition, every time a record is added to, or removed from, the authoritative DNS server, new NSEC3 records must be created, which, in the case of adding a new name, requires a computationally expensive hash of that new name to be computed.

This computational burden on the caching and authoritative DNS servers creates a risk of outage from a Denial of Service (DoS) attack—an attacker making a large number of random DNS queries will consume significant computational resources in both caching and authoritative DNS servers, potentially disrupting service for other users.

Thus, there is trade-off: to make NSEC3 records effective at blocking an attacker from listing all the DNS records, systems must use a computationally expensive hash function. The more expensive the hash function is, the more effective the defense. But in the process, making that hash function expensive creates an equivalent computational burden for the caching and authoritative DNS servers, and a corresponding risk of vulnerability to Denial of Service attack.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for servicing a DNS resolution request from a client. The method includes receiving, at a server, a request from a DNS client. The request identifies a domain name to be resolved for the client. The domain name includes a domain name that is not able to be resolved by the server as the domain name does not correspond to a record for a domain name that can be resolved by the server. The method further includes identifying a hash of the domain name as being part of a set of hashes. Each of the hashes in the set of hashes are hashes of domain names that cannot be resolved by the server. The hash of the domain name identified at the server was computed using a first cryptographic technique. However, the hash can be computed by an external system using a second cryptographic technique. The first cryptographic technique is able to compute the hash in substantially fewer or substantially less complex operations than the operations required to compute the hash using the second cryptographic technique. As a result of identifying a hash of the domain name at the server as being part of the set of hashes, the method further includes returning a result indicating that the domain name cannot be resolved, including returning an indicator identifying the set of hashes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some embodiments implemented here implement a novel application of a cryptographic technique known as a 'time-lock puzzle' to the calculation of NSEC3 records. A time-lock puzzle typically defines two calculation methods that arrive at the same answer, where one methods is relatively simple to solve as compared to the second method which is relatively more complex (sometimes significantly more complex) solve as compared to the first method. This provides a means of reducing the computation load for an authoritative server to calculate an NSEC3 record whilst simultaneously increasing the security against DNS record enumeration offered by NSEC3.

Figure 1:
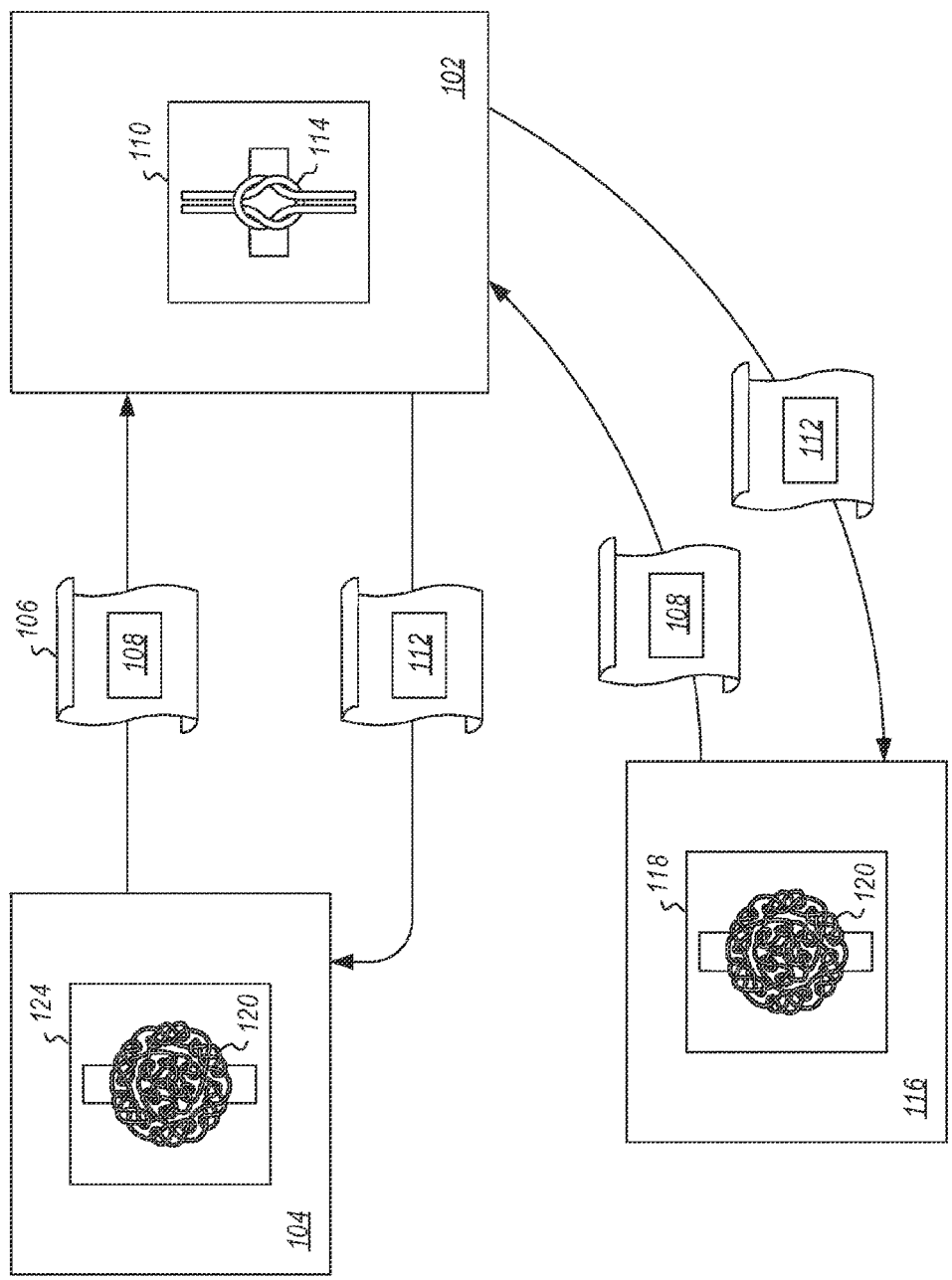
FIG. 1 illustrates a simplified example of a DNS service including a DNS server, a client, and a nefarious device.

Reference is now made to FIG. 1 which illustrates one simplified example. In the example illustrated in FIG. 1, an authoritative DNS server 102 is illustrated. A client device 104 can send a request 106 to the server 102 (typically through a caching DNS server as will be explained in more detail below). The request 106 may be a request for a domain name 108 to be resolved to an IP address by the authoritative DNS server 102. Supposing that the domain name 108 is a domain name that cannot be resolved by the authoritative DNS server 102 (i.e. there is no record for the domain name at the authoritative DNS server 102 that allows the domain name to be resolved to an IP address), then the authoritative server uses a hashing module 110 to compute a hash of the domain name 108 to identify an NSEC3 record to which the hash of the domain name 108 belongs. The authoritative DNS server 102 can return the NSEC3 record 112 to the client device 104 and/or a caching DNS server.

As illustrated in FIG. 1, the hashing module 110 uses a relatively simple function 114 (illustrated by a simple square knot) to compute the hash of the domain name 108. The function may use secret operands that are only available to the authoritative DNS server 102 or its delegates. However the hash needs to be able to be calculated by other entities as well. Thus, the hash can be calculated by a more complex method when the secret operands are not available.

For example, FIG. 1 illustrates a nefarious device 116. The nefarious device 116 may also request that the domain name 108 be resolved as part of a query scheme to identify NSEC3 records, such as the NSEC3 record 112. The nefarious device 116 can then compute hashes of domain names to identify domain names that can be resolved by the authoritative DNS server 102. The nefarious device 116 also includes a hashing module 118. The hashing module 118 of the nefarious device 116 uses a hashing function 120 (represented by a "Gordian knot") that computes hashes and, given the same input, produces the same result as the hashing function 114 at the authoritative DNS server 102. Without the secret operands, the hash can be computed, but in a much less efficient manner. This can be done by using a time-lock puzzle where the simply computed solution can be computed by the authoritative DNS server 102 and any other entities, such as the nefarious device 116 computes the hash using the more complexly computed solution.

Thus a computationally asymmetric hash function may be used. A computationally asymmetric hash function is a cryptographic hash function that requires a configurable (typically large) computational effort T to compute using public information, but which can be computed in a (typically much shorter) fixed time T' given some secret parameters. Thus, the authoritative DNS server 102 can use the shorter computation while others are required to use the longer computation.

As noted above, one example of a computationally asymmetric hash function is a time-lock puzzle. A time-lock puzzle is a cryptographic technique by which a 'puzzle' can be constructed and published for which the only known solution requires an arbitrarily large amount of computational effort, but for which the publisher has a 'short cut'. One such puzzle is illustrated in an example by Ron Rivest, which is outlined below as applied to some embodiments of the present invention. The time-lock puzzle published by Ron Rivest is also known as the LCS35 Time Capsule Crypto-Puzzle and is as follows:

Let N be an RSA modulus, the product of two large primes p and q.

The problem is to compute $C^{2^t} \pmod N$ for specified values of C and t.

Without knowing p and q, this can only be achieved by starting with C and computing t successive squarings, modulo N. The larger the value t that is chosen, the longer this will take.

However, if p and q are known then $C^{2^t}$ can be computed using Euler's Theorem as $C^e \pmod{N}$, where $e=2^t \pmod{(p-1)(q-1)}$. This only requires a fixed amount of time, regardless of the value of t. Thus, in this example, C can be a numerical representation of the domain name 108 (such as by computing a conventional hash of the domain name 108).

A hash function is a mapping from an arbitrary input or message M to a fixed-length hash H. A cryptographic hash function has the additional properties that the value H is randomly-distributed within the set of possible values, and it is not possible (except by brute-force means which are computationally infeasible) either to compute M from H or to compute a pair of messages M, M' with the same hash value.

Cryptographic hash functions are widely used primitives in the field of information security, underpinning various techniques from digital signatures to password protection. They are also, as noted above, used in the construction of NSEC3 records in DNSSEC.

The time-lock puzzle presented earlier can be used to construct a computationally asymmetric hash function. In particular, embodiments can compute a conventional cryptographic hash of a given message M (such as the domain name 108 illustrated above), and use a numerical version of this hash as the value C. Embodiments can now construct any suitably large RSA modulus N, and choose the value t to give the desired execution time T based on an estimate of the time required to compute each modulo N squaring.

The value $C^{2^t}$ computed as per the time-lock puzzle described above is truncated (or again, conventionally hashed) to give the output of the computationally asymmetric hash function.

The hash parameters N and t can be made public. Anyone can then compute the computationally asymmetric hash of any message M, given sufficient time. The secret parameters p and q (the prime factors of the RSA modulus N) enable the hash to be computed in a fixed time, independent of the value of t.

Thus, some embodiments can be used to improve performance and/or security of NSEC3 records in DNSSEC. This can be accomplished by replacing the cryptographic hash function used in the construction of NSEC3 records with a cryptographically asymmetric hash function, where the authoritative DNS server 102 has constructed the hash function parameters N and t and knows the secret parameters p and q (or other parameters if other asymmetric hashing is used).

An attacker, such as the nefarious device 116 wishing to use the NSEC3 records to list the zone contents must search for DNS record names whose hash matches the values in the NSEC3 records. This is a computationally intensive task, and can be made progressively more time-consuming by increasing the value of the parameter t in the illustrated example.

In contrast, the challenge faced by the authoritative name server is much simpler. It can use the secret parameters p and q to compute the same hash value in fixed time, independent of t.

Figure 2:
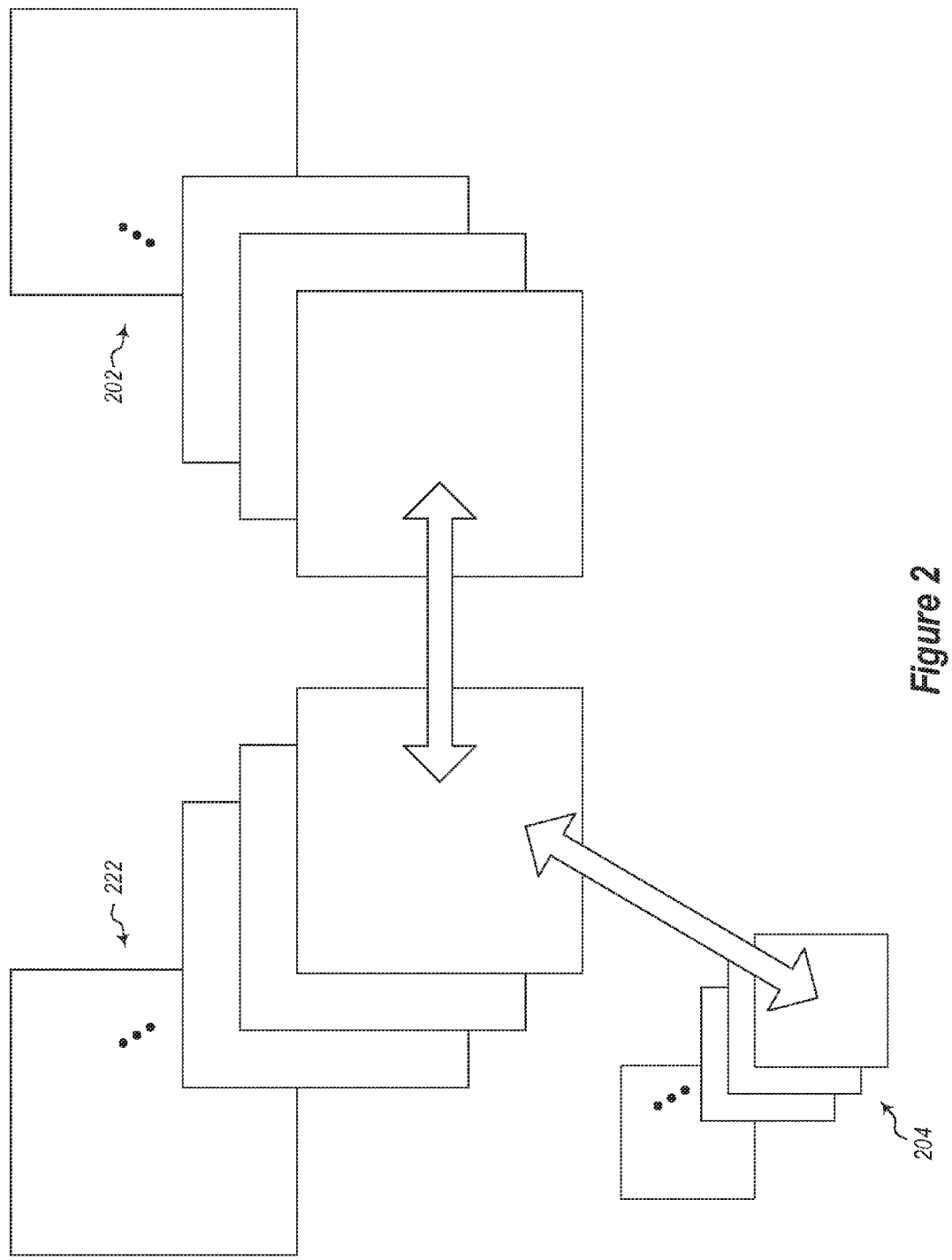
FIG. 2 illustrates an example of a DNS resolution system.

While the example illustrated in FIG. 1 is a simplified version of how a typical DNS resolution system works, in actual practice, DNS systems are more complex. In particular, as illustrated in FIG. 2, a typical DNS system includes several authoritative DNS servers 202, but also includes a plurality of caching DNS servers 222 that are distributed in various logical or physical locations. This can be useful for several reasons. First, this can reduce the number of requests being made to the actual authoritative DNS servers 202 as caching DNS servers 222 can send consolidated requests from multiple clients 204 to the authoritative DNS servers 202 and cache the results for use in servicing client requests. Further, the caching DNS servers 222 can be located in close proximity (either logically and/or physically) to client devices 204 which allows requests to be received and replies to be sent to the client devices 204 quickly and efficiently.

A caching DNS server would not typically have the secret parameters p and q (or other secret parameters in different embodiments), and thus would not benefit from the use of the computationally asymmetric hash function. However, some embodiments may address this by off-loading the NSEC3 hash validation step to the DNS client devices 204, thus allowing the computational load to be lifted from the caching DNS servers 220.

This off-loading can be achieved by having a caching DNS server perform all other parts of the DNSSEC validation (e.g. signature validation) and requiring the DNS client simply to verify that any NSEC3 record received includes a set of hashes, such as for example a range of hashes, that includes the hash of domain name in the original query. Thus, for example, in FIG. 1, the client device 104 may include a hashing module 124 that is similar or identical to the hashing module 118 of the nefarious device 116 which can use the function 120 to compute the hash of the domain name 108. The client 104 can then confirm that the hash of the domain name 108 falls within the NSEC3 record 112. Alternatively, this may be achieved by requiring the full DNSSEC validation to be performed by the DNS client. Off-loading the computational effort is acceptable, since a well-behaved DNS client typically makes very few if any queries against non-existent records, and can therefore afford the occasional cost of validating an isolated NSEC3 response. However, a client that is part of an NSEC3 compilation attack will be overly burdened by being caused to frequently calculate various hash values. Using the computationally asymmetric hash function described above, the value t is selected to allow the DNS Client to verify an NSEC3 response in a reasonable time (for example, 1 second). This time is far larger than could be permitted were a caching or authoritative DNS server required to perform the same calculations on behalf of thousands, or even millions of DNS clients. Additionally, by offloading computations to a caching server or directly to the client, advantages can be obtained during a denial of service (DoS) attach in that the authoritative server (and the caching server, in the case of client offloading) has less work to do to withstand the DoS attack.

In alternative embodiments, some (or all) caching DNS servers may be trusted servers that may be entrusted with the parameters p and q (or other parameters) allowing the caching DNS server to locally perform validation. Additionally or alternatively, in some embodiments, certain DNS client devices may be trusted devices and may be entrusted with the parameters p and q. However, it should be appreciated that it may be preferable for limited numbers of devices to have the secret parameters.

The computationally asymmetric hash function removes the trade-off described earlier—replacing the NSEC3 hash function with a computationally asymmetric hash function enables the computational barrier for an attacker to list all DNS records to be greatly increased, without a consequent increase in the computational load on the caching or authoritative DNS servers—indeed, their workload may even be reduced.

The DNSSEC standard for NSEC3 records already supports fields allowing the hash algorithm and parameters to be selected (from a pre-defined range agreed upon as part of the standardization process). This mechanism is readily extensible to support hash calculations using a computationally asymmetric hash function.

One simple implementation is configured to encode the hash parameters N and t directly in the NSEC3 record itself. This has the disadvantage that since the value N is large the NSEC3 record would become bloated, and his data would, inefficiently, be repeated in each NSEC3 record.

In an alternative embodiment, the parameter N (or other parameter when a different computationally asymmetric hash function is used) can be communicated via a separate record. In some embodiments, the DNSKEY record may be used, since it is already used to communicate RSA parameters. A dedicated DNSKEY record for the NSEC3 records can be created, or the existing DNSKEY record containing the zone signing keys extended to additionally include the NSEC3 hash parameters.

In some embodiments, key rollover follows a similar or an identical process to existing DNSKEY rollover, in which a staged sequence of publishing new keys, updating signatures, and removing old keys provides zero downtime updates.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
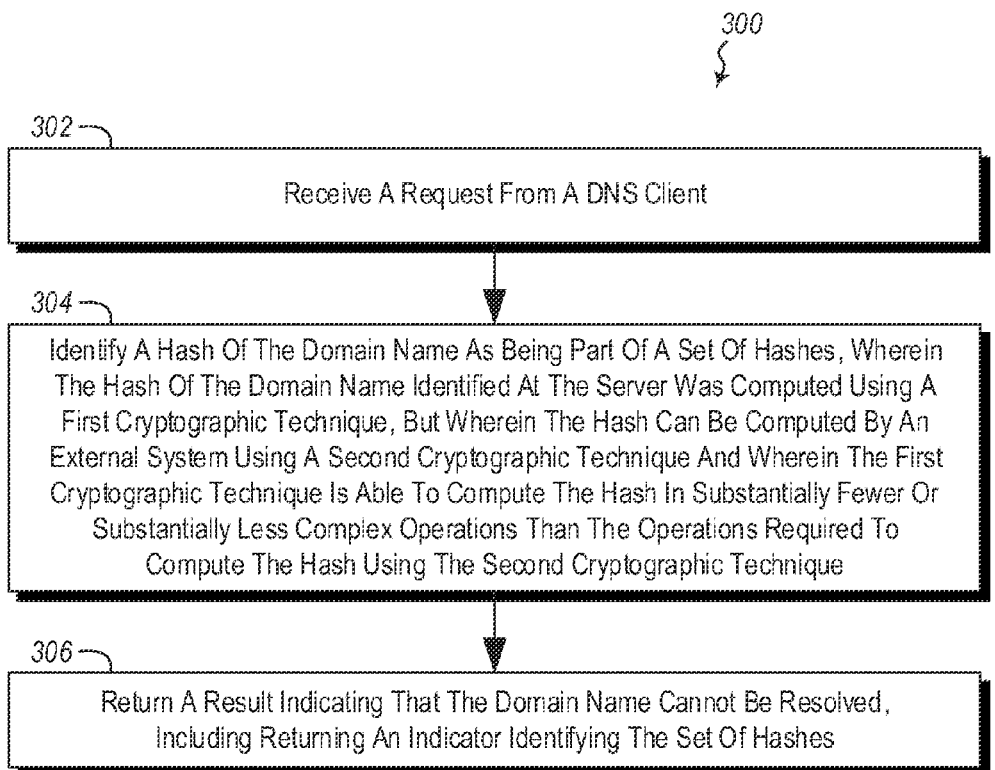
FIG. 3 illustrates a method of servicing a DNS resolution request from a client.

Referring now to FIG. 3, a method 300 is illustrated. The method 300 may be practiced in a computing environment. The method 300 includes acts for servicing a DNS resolution request from a client. The method 300 includes receiving at a server, a request from a DNS client (act 302). The request identifies a domain name to be resolved for the client. The domain name is a domain name that is not able to be resolved by the server as the domain name does not correspond to a record for a domain name that can be resolved by the server. Note that the server may be, for example, an authoritative server, such as the servers 202 or a caching server, such as the servers 222.

The method 300 further includes identifying a hash of the domain name as being part of a set of hashes (act 304). For example, the set of hashes may be a range of hashes. Thus a set in NSEC3 may be represented as a range between <X> and <Y>, where <X> and <Y> are from a sorted list of hashes of the actual DNS records. Each of the hashes in the set of hashes is a hash of domain names that cannot be resolved by the server. The hash of the domain name identified at the server was computed using a first cryptographic technique. However, the hash can be computed by an external system using a second cryptographic technique. The first cryptographic technique is able to compute the hash in substantially fewer or substantially less complex operations than the operations required to compute the hash using the second cryptographic technique. For example, as illustrated above, the hash may be computed using a computationally asymmetric hash function.

As a result of identifying a hash of the domain name at the server as being part of the set of hashes, the method 300 further includes returning a result indicating that the domain name cannot be resolved, including returning an indicator identifying the set of hashes (act 306). For example, the server, which may be a caching server or authoritative DNS server, may return an NSEC3 record. Thus, the method 300 may be practiced where the set of hashes is identified as being part of an NSEC3 record.

The method 300 may further include causing at least a portion of the first technique to be kept secret such that only a limited number of entities are able to calculate the hash using the first technique. Thus, for example, in some embodiments, only authoritative servers may have constants or algorithms available to perform the first technique.

The method 300 may further include the server establishing a trust relationship with an intermediate server between the server and the client, and as a result of the trust relationship, the server causing the intermediate server to compute the hash of the domain name using the first cryptographic technique. For example, caching DNS servers may have a trust relationship with the authoritative DNS server allowing the caching DNS servers to use the first technique.

The method 300 may further include the server establishing a trust relationship with the client, and as a result of the trust relationship, the server causing the client to compute the hash of the domain name using the first cryptographic technique. However, typically, a client will only be able to compute the hash using the second cryptographic technique.

The method 300 may further include the server causing the client to compute the hash of the domain name using the second cryptographic technique to verify that the hash of the domain name is included in the set of hashes. This may be used, for example, if the client is querying a caching DNS server that is not able to use the first technique and thus can offload the work of the computation of the hash to the client. The client can then send the computed hash to the caching DNS server, where an NSEC3 record can be identified for the hash.

The method 300 may further be practiced where the first technique comprises computing $C^e$(modulo N), where $e=2^t$ (modulo(p−1)(q−1)). The second technique comprises computing $C^{2^t}$(mod N). N is an RSA modulus, the product of two large primes p and q. C is a representation of the domain name, such as a hash of the domain name. t is some number. In some cases t is selectable to select an amount of computation required by entities that use the second technique. In some embodiments, C is calculated by performing a hash of the domain name. This hash computation may be, for example, some conventional or otherwise agreed upon hash calculation.

The method 300 may further include determining a threshold amount of computing desired for the second cryptographic technique, and selecting a parameter of the second technique to achieve at least the threshold amount of computing. For example, as described above, the value t may be selected to cause a certain amount of computing to be done for the second cryptographic technique.

Figure 4:
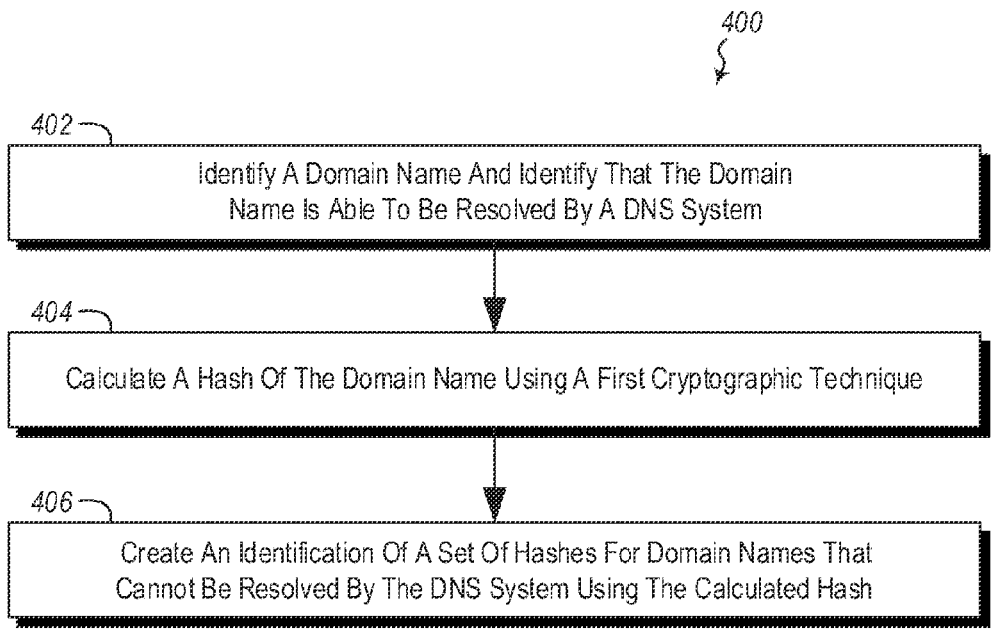
FIG. 4 illustrates a method of indexing hashes of domain names for use in a DNS service.

Referring now to FIG. 4, a method 400 is illustrated. The method 400 may be practiced in a computing environment. The method includes acts for indexing hashes of domain names for use in a DNS service. The method includes identifying a domain name and identifying that the domain name is able to be resolved by a DNS system (act 402). The method further includes calculating a hash of the domain name using a first cryptographic technique (act 404). The hash can be computed by an external system using a second cryptographic technique. The first cryptographic technique is able to compute the hash in substantially fewer or substantially less complex operations than the operations required to compute the hash using the second cryptographic technique.

The method further includes creating an identification of a set of hashes for domain names that cannot be resolved by the DNS system using the calculated hash (act 406). The hash of the domain name represents a hash immediately adjacent the set of hashes for domain names that cannot be resolved by the DNS system.

Thus, for example, if a new domain name is being added to an index, the new domain name has its hash calculated using a less complex calculation of an asymmetric hash function. The new domain name being indexed will result in the creation of two new sets of hashes for NSEC3 records formed from the NSEC3 record to which the hash of the domain name previously belonged, an NSEC3 record before the hash of the new domain name, and an NSEC3 record after the hash of the new domain name. Each of the new NSEC3 records may include the computed hash in the NSEC3 record to identify the boundary of the NSEC3 record.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of servicing a DNS resolution request from a client, the method comprising:

receiving at a server, a request from a DNS client, the request identifying a domain name to be resolved for the client, and wherein the domain name comprises a domain name that is not able to be resolved by the server as the domain name does not correspond to a record for a domain name that can be resolved by the server;

identifying a hash of the domain name as being part of a set of hashes, each of the hashes in the set of hashes being hashes of domain names that cannot be resolved by the server, and wherein the hash of the domain name identified at the server was computed using a first cryptographic technique, but wherein the hash can be computed by an external system using a second cryptographic technique and wherein the first cryptographic technique is able to compute the hash in substantially fewer or substantially less complex operations than the operations required to compute the hash using the second cryptographic technique;

as a result of identifying a hash of the domain name at the server as being part of the set of hashes, returning a result indicating that the domain name cannot be resolved, including returning an indicator identifying the set of hashes, and as part of a verification process of the result indicating that the domain name cannot be resolved, causing the client to compute the hash of the domain name using the second cryptographic technique, after receiving the indicator identifying the set of hashes, such that the hash of the domain name was computed using the first cryptographic technique prior to causing the client to compute the hash of the domain name using the second cryptographic technique, to verify that the hash of the domain name is included in the set of hashes.

2. The method of claim 1, wherein the set of hashes is identified as being part of an NSEC3 record.

3. The method of claim 1, further comprising causing at least a portion of the first technique to be kept secret such that only a limited number of entities are able to calculate the hash using the first technique.

4. The method of claim 1, further comprising the server establishing a trust relationship with an intermediate server between the server and the client, and as a result of the trust relationship, the server causing the intermediate server to compute the hash of the domain name using the first cryptographic technique.

5. The method of claim 1, wherein the first technique comprises computing $C^e$(modulo N), where $e=2^t$(modulo $(p-1)(q-1)$), and the second technique comprises computing $C^{2^t}$ (mod N), where N is an RSA modulus, the product of two large primes p and q, where C is a representation of the domain name, and t is some number.

6. The method of claim 5, wherein C is calculated by performing a transformation of the domain name.

7. The method of claim 1, further comprising determining a threshold amount of computing desired for the second cryptographic technique, and selecting a parameter of the second technique to achieve at least the threshold amount of computing.

8. In a computing environment, a system for servicing a DNS resolution request from a client, the system comprising:

one or more processors; and one or more computer-readable media devices, wherein the one or more computer-readable media devices comprise computer-executable instructions that when executed by at least one of the one or more processors cause at least one of the one or more processors to perform the following:

receiving at a server, a request from a DNS client, the request identifying a domain name to be resolved for the client, and wherein the domain name comprises a domain name that is not able to be resolved by the server as the domain name does not correspond to a record for a domain name that can be resolved by the server;

identifying a hash of the domain name as being part of a set of hashes, each of the hashes in the set of hashes being hashes of domain names that cannot be resolved by the server, and wherein the hash of the domain name identified at the server was computed using a first cryptographic technique, but wherein the hash can be computed by an external system using a second cryptographic technique and wherein the first cryptographic technique is able to compute the hash in substantially fewer or substantially less complex operations than the operations required to compute the hash using the second cryptographic technique;

as a result of identifying a hash of the domain name at the server as being part of the set of hashes, returning a result indicating that the domain name cannot be resolved, including returning an indicator identifying the set of hashes; and as part of a verification process of the result indicating that the domain name cannot be resolved, causing the client to compute the hash of the domain name using the second cryptographic technique, after receiving the indicator identifying the set of hashes, such that the hash of the domain name was computed using the first cryptographic technique prior to causing the client to compute the hash of the domain name using the second cryptographic technique, to verify that the hash of the domain name is included in the set of hashes.

9. The system of claim 8, the one or more computer-readable media devices further comprising computer-executable instructions that when executed by at least one of the one or more processors cause the server to establish a trust relationship with an intermediate server between the server and the client, and as a result of the trust relationship, the server to cause the intermediate server to compute the hash of the domain name using the first cryptographic technique.

10. The system of claim 8, wherein the first technique comprises computing $C^e$(modulo N), where $e=2^t$(modulo $(p-1)(q-1)$), and the second technique comprises computing $C^{2^t}$(mod N), where N is an RSA modulus, the product of two large primes p and q, where C is a representation of the domain name, and t is some number.

11. The system of claim 10, wherein C is calculated by performing a transformation of the domain name.

12. The system of claim 8, the one or more computer-readable media devices further comprising computer-executable instructions that when executed by at least one of the one or more processors cause the system to determine a threshold amount of computing desired for the second cryptographic technique, and select a parameter of the second technique to achieve at least the threshold amount of computing.

13. The method of claim 1, further comprising:

identifying a domain name and identifying that the domain name is able to be resolved by a DNS system;

calculating a hash of the domain name using a first cryptographic technique, but wherein the hash can be computed by an external system using a second cryptographic technique and wherein the first cryptographic technique is able to compute the hash in substantially fewer operations than the operations required to compute the hash using the second cryptographic technique; and creating an identification of a set of hashes for domain names that cannot be resolved by the DNS system, where the hash of the domain name represents a hash immediately adjacent the set of hashes.

14. The method of claim 13, wherein the set of hashes is identified as being part of an NSEC3 record.

15. One or more computer-readable media devices, wherein the one or more computer-readable media devices comprise computer-executable instructions that when executed by at least one or more processors cause at least one of the one or more processors to perform the following:

receiving at a server, a request from a DNS client, the request identifying a domain name to be resolved for the client, and wherein the domain name comprises a domain name that is not able to be resolved by the server as the domain name does not correspond to a record tor a domain name that can be resolved by the server;

identifying a hash of the domain name as being part of a set of hashes, each of the hashes in the set of hashes being hashes of domain names that cannot be resolved by the server, and wherein the hash of the domain name identified at the server was computed using a first cryptographic technique, but wherein the hash can be computed by an external system using a second cryptographic technique and wherein the first cryptographic technique is able to compute the hash in substantially fewer or substantially less complex operations than the operations required to compute the hash using the second cryptographic technique;

as a result of identifying a hash of the domain name at the server as bong part of the set of hashes, returning a result indicating that the domain name cannot be resolved, including returning an indicator identifying the set of hashes; and as part of a verification process of the result indicating that the domain name cannot be resolved, causing the client to compute the hash of the domain name using the second cryptographic technique, after receiving the indicator identifying the set of hashes, such that the hash of the domain name was computed using the first cryptographic technique prior to causing the client to compute the hash of the domain name using the second cryptographic technique, to verify that the hash of the domain name is included in the set of hashes.

16. The one or more computer-readable media devices of claim 15 further comprising computer-executable instructions that when executed by at least one of the one or more processors cause the server to establish a trust relationship with an intermediate server between the server and the client, and as a result of the trust relationship, the server to cause the intermediate server to compute the hash of the domain name using the first cryptographic technique.

17. The one or more computer-readable media devices of claim 15, wherein the first technique comprises computing Ce(modulo N), where e=2t(modulo(p−1)(q−1)), and the second technique comprises computing C2t(mod N), where N is an RSA modulus, the product of two large primes p and q, where C is a representation of the domain name, and t is some number.

18. The one or more computer-readable media devices of claim 17, wherein C is calculated by performing a transformation of the domain name.

19. The one or more computer-readable media devices of claim 15, further comprising computer-executable instructions that when executed by at least one of the one or more processors cause at least one of the processors to determine a threshold amount of computing desired for the second cryptographic technique, and select a parameter of the second technique to achieve at least the threshold amount of computing.

20. The one or more computer-readable media devices of claim 15, further comprising computer-executable instructions that when executed by at least one of the one or more processors cause at least one of the processors to:

identify a domain name and identifying that the domain name is able to be resolved by a DNS system;

calculate a hash of the domain name using a first cryptographic technique, but wherein the hash can be computed by an external system using a second cryptographic technique and wherein the first cryptographic technique is able to compute the hash in substantially fewer operations than the operations required to compute the hash using the second cryptographic technique; and create an identification of a set of hashes for domain names that cannot be resolved by the DNS system, where the hash of the domain name represents a hash immediately adjacent the set of hashes.

* * * * *